United States Patent
Rizzo

(10) Patent No.: US 12,157,537 B2
(45) Date of Patent: Dec. 3, 2024

(54) BICYCLE COMPONENT PROVIDED WITH ELECTRONIC DEVICE

(71) Applicant: CAMPAGNOLO S.r.l., Vicenza (IT)

(72) Inventor: Antonio Rizzo, Montagnana (IT)

(73) Assignee: CAMPAGNOLO S.R.L., Vicenza (IT)

( * ) Notice: Subject to any disclaimer, the term of this patent is extended or adjusted under 35 U.S.C. 154(b) by 882 days.

(21) Appl. No.: 17/241,335

(22) Filed: Apr. 27, 2021

(65) Prior Publication Data

US 2021/0331766 A1 Oct. 28, 2021

(30) Foreign Application Priority Data

Apr. 28, 2020 (IT) .................... 102020000009193

(51) Int. Cl.
| | |
|---|---|
| *B62M 6/50* | (2010.01) |
| *B62J 45/411* | (2020.01) |
| *B62J 45/413* | (2020.01) |
| *B62J 45/414* | (2020.01) |
| *B62J 45/415* | (2020.01) |
| *B62J 45/421* | (2020.01) |

(52) U.S. Cl.
CPC ............. *B62M 6/50* (2013.01); *B62J 45/411* (2020.02); *B62J 45/413* (2020.02); *B62J 45/414* (2020.02); *B62J 45/415* (2020.02); *B62J 45/421* (2020.02)

(58) Field of Classification Search
CPC ............................... B62J 45/421; B62J 45/411
See application file for complete search history.

(56) References Cited

U.S. PATENT DOCUMENTS

| | | | |
|---|---|---|---|
| 2006/0241817 A1* | 10/2006 | Patenaude | B60R 25/33 701/1 |
| 2008/0098246 A1* | 4/2008 | Kim | G06F 1/3203 713/323 |
| 2009/0240858 A1* | 9/2009 | Takebayashi | H04L 12/403 710/110 |
| 2010/0150042 A1* | 6/2010 | Oh | H04W 52/0235 370/311 |
| 2016/0311491 A1* | 10/2016 | Watarai | B62J 45/20 |

(Continued)

FOREIGN PATENT DOCUMENTS

| | | |
|---|---|---|
| CN | 202 916 787 U | 5/2013 |
| EP | 2 719 616 A2 | 4/2014 |

(Continued)

OTHER PUBLICATIONS

Italian Search Report with Annex, Italian Application No. 102020000009193, Dec. 21, 2020 with English translation.

*Primary Examiner* — Jacob D Knutson
(74) *Attorney, Agent, or Firm* — Steinfl + Bruno LLP

(57) ABSTRACT

The invention relates to a method of operating an electronic device associated with a related bicycle component and comprising a processor and a wake unit, the method comprising the following steps executable by the processor of the electronic device: operating alternately in standby mode and in running mode, switching from the standby mode to the running mode upon receiving a wake signal from the wake unit at predetermined wake conditions, and before switching from the running mode to the standby mode, modifying the configuration of the wake unit by updating the predetermined wake conditions, such that the subsequent wake signal is sent to the processor at updated wake conditions.

20 Claims, 5 Drawing Sheets

(56) References Cited

U.S. PATENT DOCUMENTS

2016/0311500 A1   10/2016  Kasai
2019/0002057 A1*  1/2019  Jordan ................. F16H 59/044
2019/0344857 A1* 11/2019  Fossato ................... B62M 6/50
2020/0062340 A1*  2/2020  Tsai ...................... G06F 1/3287

FOREIGN PATENT DOCUMENTS

| EP | 3 566 935 A1 | 11/2019 |
| KR | 101 419 516 B1 | 7/2014 |
| WO | 2013/142977 A1 | 10/2013 |
| WO | 2018/207362 A1 | 11/2018 |

\* cited by examiner

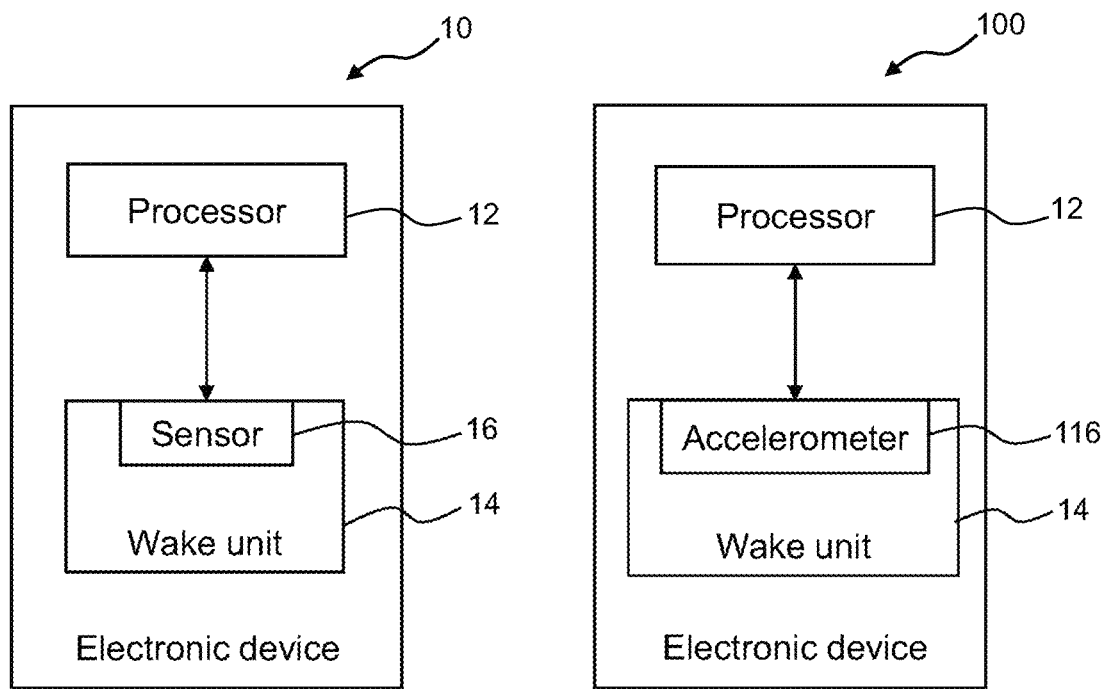
FIG. 1
FIG. 2
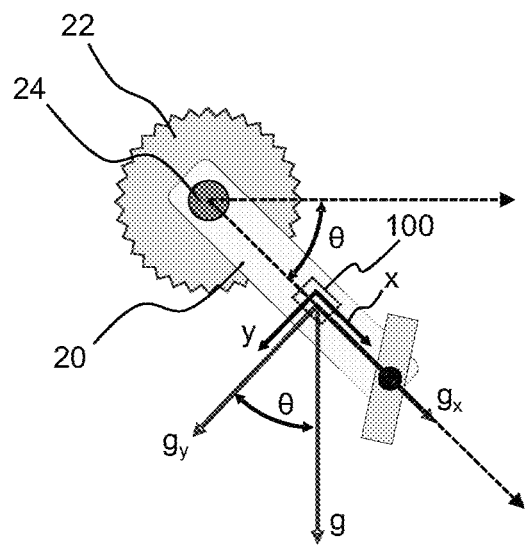
FIG. 3
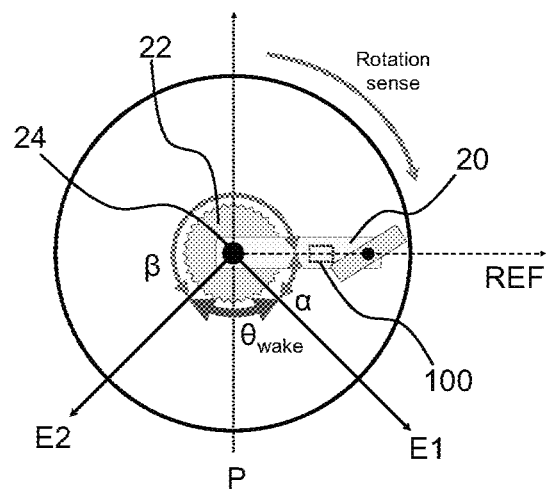
FIG. 6

BICYCLE COMPONENT PROVIDED WITH ELECTRONIC DEVICE

CROSS REFERENCE TO RELATED APPLICATIONS

This application claims the benefit of Italian Application No. 102020000009193, filed on Apr. 28, 2020, which is incorporated herein by reference as if fully set forth.

FIELD OF INVENTION

The invention relates in general to the field of bicycles, and in particular to a bicycle component provided with electronic device and to a related operating method.

BACKGROUND

Bicycles are increasingly equipped with one or more electronic devices. An electronic device of particular interest here is for example a torque or power meter that can be associated with a bicycle component like, for example, a transmission component. In the present description and in the attached claims, the term "torque meter" is meant to indicate an instrument for detecting the torque delivered by the cyclist; the term "power meter" is meant to indicate an instrument for detecting the pedaling power. As known, power measurements can be obtained by a processor by combining the output of a torque meter with the output of an angular speed meter.

Another example of electronic device can consist of a wireless communication system, i.e. a radio system that transmits/receives commands, which can be associated with a bicycle component like, for example, a transmission component, a wheel, a hub, a (front or rear) derailleur element, a derailleur control device, in particular associated with the handlebars, a brake lever, a saddle, a seat post, a suspension, and the like.

The electronic devices generally comprise one or more electronic components (like, for example, a processor) and are in general powered through one or more battery power units suitably arranged over the bicycle. Sometimes, each electronic device of the bicycle includes its own battery power unit.

The battery power units that power the electronic devices can be replaceable, rechargeable on-board or rechargeable while detached from the bicycle. In all cases, it is necessary to keep the energy consumption of the electronic devices as low as possible in order to preserve the charge of the battery power unit and therefore the autonomy of the electronic device.

For this purpose, besides providing the electronic device with an actual on/off switch, it is possible to provide for operating one or more of the electronic components of the device (like, for example, a processor) according to different operating modes, for example by alternating a running mode with a standby mode.

In the present description and in the attached claims, under "standby mode", sometimes also indicated as sleep or wait or low-power mode, a condition in which an electronic component is not operating, though is ready to switch from a state of temporary non-use to running mode, is meant to be indicated; in standby mode, typically, only those circuits that allow the component to start up upon receiving commands or in general inputs that involve the actuation thereof are kept operating, so that there is low electrical energy consumption.

Vice-versa, in the present description and in the attached claims, under "running mode" of an electronic component, a mode is meant to be indicated, in which the component is ready to receive commands or in general inputs and to perform tasks, even though it can be engaged only in waiting for commands and inputs, without performing any specific task.

The switching from a standby mode to a running mode is indicated, in the present description and in the attached claims, as wake of an electronic component. More in general, under wake of a component, keeping a device in running mode, preventing it from entering into standby mode is also meant to be encompassed. A same signal or a similar signal can be used in both cases.

The Applicant notes that the switching from a standby mode to a running mode is generally controlled by a wake mechanism adapted for emitting a wake signal. The wake signal can be emitted based on detections made by a suitable sensor associated with the electronic device.

For example, European patent application EP3566935A1, to the same Applicant, describes a bicycle crankarm provided with an electronic system including a battery power unit, a processor having a standby mode and a running mode, and a wake unit that emits a wake signal of the processor.

In an embodiment described therein, the wake unit is embodied by an accelerometer and the wake signal consists of an interrupt generated by the accelerometer when it detects along one of its axes an acceleration equal to or greater than a threshold value, or minimum acceleration.

SUMMARY

The Applicant faced the technical problem of providing an alternative wake mechanism that is reliable and effective.

In a first aspect thereof, the invention therefore relates to a method of operating an electronic device associated with a bicycle component and comprising a processor and a wake unit, the method comprising the following steps executable by the processor of the electronic device:

operating alternatively in standby mode and in running mode, switching from the standby mode to the running mode upon receiving a wake signal from the wake unit at predetermined wake conditions, and before switching from the running mode to the standby mode, modifying the configuration of the wake unit by updating the predetermined wake conditions, such that the subsequent wake signal is sent to the processor at updated wake conditions.

In a second aspect thereof, the invention also relates to a bicycle component comprising an electronic device including:

a processor suitable for operating alternately in standby mode and in running mode, and a wake unit operatively connected to the processor and configured so as to send a wake signal to the processor to switch from the standby mode to the running mode at predetermined wake conditions, characterized in that, before switching from the running mode to the standby mode, the processor is each time suitable for modifying the configuration of the wake unit by updating the predetermined wake conditions, such that the subsequent wake signal is sent to the processor at updated wake conditions.

As will be clear from the following description, updating (in other words, modifying) each time the wake conditions, such that the subsequent wake signal is sent to the processor at updated (in other words modified) wake conditions, advantageously allows to obtain an alternative, reliable and effective wake mechanism.

Furthermore, in embodiments of the invention, the update of the wake conditions allows in particular to minimize the chances of undesired wakes of the processor of the electronic device, and thus to preserve the charge of the battery power unit that powers the device and its components.

The present invention can in one or more of the aspects thereof have one or more of the preferred features given hereinafter, which can be combined as desired with each other depending on the application requirements.

Preferably, the bicycle component is a moving bicycle component.

In the present description and in the attached claims, by moving component of a bicycle, a bicycle component that in use can move between one or more positions with respect to a fixed reference element of the bicycle, for example through a translational and/or rotational movement about a rotation axis, is meant to be indicated.

The fixed reference element of the bicycle is for example the frame of the bicycle.

Non-limiting examples of moving components of a bicycle include a rotating bicycle component, an element of a moving body of a (front or rear) derailleur, a saddle, a seat post, a suspension, a derailleur control device, in particular associated with the handlebars.

More preferably, the bicycle component is a rotating bicycle component.

In the present description and in the attached claims, under "rotating bicycle component", a bicycle component configured to rotate, in use, about a rotation axis thereof, is meant to be indicated.

For example, such rotating component can be a wheel, a rim, a hub, a shaft of an actuator adapted for moving an element of the bicycle (for example a shaft of a motor or of a gearmotor associated with an electro-mechanical actuator of the derailleur), or a bicycle transmission component.

In the present description and in the attached claims, under "bicycle transmission component", a component that is set into rotation exclusively through the pedaling movement imparted by the cyclist during the use of the bicycle (and not when the bicycle is moved on a travel surface from the outside, for example through a displacement by hand by a user), is meant to be indicated.

Even more preferably, the bicycle component is a bicycle transmission component.

The bicycle transmission component is preferably selected from the group consisting of a crankarm, a pedal, a spider leg of a crankarm on the transmission side, a chainring, a bottom bracket spindle, a freewheel body of a cogset, a sprocket.

Preferably, the predetermined wake conditions comprise at least one condition selected from the group consisting of a predetermined position of the bicycle component with respect to a fixed reference element of the bicycle, a predetermined inclination taken up by the bicycle and/or by the bicycle component with respect to a reference axis, a predetermined load acting on the bicycle component, a predetermined angular position of the rotating bicycle component or of the bicycle transmission component, taken up during a rotational movement about a rotation axis.

In particular, when the bicycle component is a moving component, the predetermined wake conditions preferably comprise a predetermined position of the bicycle component with respect to a fixed reference element of the bicycle, like for example the frame.

In the case of a rotating component and more in particular in the case of a bicycle transmission component, the predetermined wake conditions preferably comprise a predetermined angular position of the bicycle component, taken up during a rotational movement about a rotation axis.

In particular in the case in which the bicycle component is a transmission component, the provision of an update of the predetermined wake conditions for the emission of each subsequent wake signal has a particularly advantageous implementation, since the chances that involuntary movements or vibrations of the bicycle component, not corresponding to rotations imparted by the cyclist through a voluntary pedaling movement, can satisfy such predetermined wake conditions and cause an undesired waking of the processor of the electronic device, are effectively minimized, thus advantageously preserving the charge of the battery power unit that powers the electronic device and the components thereof.

Indeed, since the update of the predetermined wake conditions involves modifying the angular position of the bicycle component at which the wake signal is emitted, the chances that the component randomly moves into the updated angular position, which is different each time from the previous one, are consistently reduced, if not substantially canceled.

In other words, undesired and repeated vibrations or movements in a same direction and/or in a same sense are prevented from causing the wake of the processor in an undesired manner.

This type of wake mechanism is thus particularly suitable for electronic devices such as torque or power meters applied for example to a crankarm or other transmission component, since such type of torque or power meter must necessarily pass through specific angular positions, in a specific order, bound by the fact that the cyclist must pedal to generate power.

Even more preferably, the bicycle component is a crankarm.

In this case, the electronic device is preferably fixed onto the crankarm or integrated in the crankarm.

More preferably, the crankarm is monolithic and made of composite material comprising structural fiber incorporated in a polymeric matrix, the crankarm being co-molded with one or more printed circuit boards that implement said electronic device.

Preferably, the wake unit comprises a sensor configured to detect parameters associated with the bicycle component, and the wake unit is configured to send said wake signal to the processor when the parameters detected by the sensor satisfy the wake conditions.

Preferably, in this case, the method further comprises the following steps, executable by the wake unit of the electronic device:

detecting the parameters associated with the bicycle component by means of said sensor; and sending the wake signal to the processor when the detected parameters satisfy the predetermined wake conditions.

In embodiments, in the step of modifying the configuration of the wake unit, the updated wake conditions are defined starting from the predetermined wake conditions.

According to this way of updating the wake conditions, also indicated hereinafter as "wake-wake", the updated wake conditions are defined starting from the predetermined wake conditions, in other words those at which the processor woke up the previous time.

In particular, in the embodiments in which the wake conditions comprise a predetermined angular position of the rotating bicycle component or of the bicycle transmission component, the updated angular position is moved by a predetermined updating angle with respect to said predetermined angular position of the bicycle component.

In this case, again in accordance with the "wake-wake" updating mode of the wake conditions, the updated angular wake position is defined starting from the predetermined angular position, which corresponds to the last angular wake position of the bicycle component, in other words the one at which the processor woke up the previous time.

Preferably, in alternative embodiments, in the step of modifying the configuration of the wake unit, the updated wake conditions are defined starting from a value taken up by the parameters detected by the wake unit upon switching from the running mode to the standby mode of the processor.

This updating mode of the wake conditions, also indicated hereinafter as "sleep-wake", provides for the definition of the updated wake conditions based on the value taken up by the parameters associated with the bicycle component upon sleeping or entering into the standby step of the processor.

In particular, in the embodiments in which the wake conditions comprise a predetermined angular position of the rotating bicycle component or of the bicycle transmission component, the updated angular position is moved by a predetermined updating angle with respect to the angular position taken up by the bicycle component upon switching from the running mode to the standby mode of the processor.

In this specific case, in accordance with the "sleep-wake" updating mode of the wake conditions, the subsequent updated angular positions are determined from the last angular sleep position of the processor, which of course is not known a priori, therefore unlike the "wake-wake" mode the subsequent updated angular positions for each transmission of the wake signal fall substantially randomly and unpredictably along the full circle, instead of in positions predetermined from the start. This configuration is however advantageous since it further decreases the chances of undesired waking of the processor. Indeed, the updated angular position is prevented from being by chance defined at the last angular sleep position of the processor.

Preferably, in all the cases outlined above, said predetermined updating angle is 90°.

In embodiments, the processor of the electronic device is configured to switch from the standby mode to the running mode only after receiving a plurality of reiterated wake signals from the wake unit.

In this case, the step of switching from the standby mode to the running mode, executable by the processor of the electronic device, preferably comprises switching from the standby mode to the running mode only after receiving a plurality of reiterated wake signals from the wake unit.

This configuration strengthens the wake conditions against false positives, by ignoring the first wake signal (and possible further subsequent wake signals). For example, indeed, when the wake conditions comprise a predetermined angular position of the rotating bicycle component or of the bicycle transmission component, the first wake signal (and possible further subsequent wake signals) could be due, even though in rare and fortuitous cases, to an involuntary and undesired rotation of the bicycle component that brought it precisely into the updated angular position at which the emission of the first wake signal takes place.

Alternatively, the wake unit can be configured to send a wake signal to the processor only after the parameters detected by the sensor have satisfied the wake conditions a certain number of times or, for example, only after said parameters have satisfied angular positions of the rotating bicycle component progressively moved by a predetermined reiteration angle with respect to a previous angular position of the component.

Preferably, said reiteration angle is equal to said updating angle, more preferably it is equal to 90°.

Preferably, the sensor of the wake unit is selected from the group consisting of an accelerometer, a magnetic field sensor (preferably self-contained), an inclinometer, a gyroscope, a pressure sensor, a load cell.

In the present description and in the attached claims, the term "self-contained magnetic field sensor" is meant to indicate a magnetic sensor, for example a magnetometer, which is totally autonomous, not requiring, to perform its function, any other element outside of the electronic device in which it is housed. For example, the self-contained magnetic field sensor can be a magnetometer adapted for detecting the earth's magnetic field.

Preferably, the parameters associated with the bicycle component, detected by the wake unit and in particular by the sensor thereof, comprise a first component of a vector quantity, measured along a first detection axis of the sensor.

Preferably, said vector quantity is indicative of or referable to a position, more preferably to an angular position, of the bicycle component.

The vector quantity is preferably selected from acceleration, gravitational acceleration, speed, angular speed, earth's magnetic field, rotation angle.

Preferably, the parameters associated with the component, detected by the wake unit and in particular by the sensor thereof, comprise a second component of the vector quantity, measured along a second detection axis of the sensor.

In embodiments, said parameters detected by the wake unit and in particular by the sensor thereof also comprise a third component of the vector quantity, measured along a third detection axis of the sensor.

Preferably, said first component and, where present, said second and/or said third component of the vector quantity detected by the wake unit, are defined by a respective magnitude and a sign, positive or negative, that represents the direction thereof along the respective detection axis.

Preferably, said predetermined wake conditions provide for exceeding in magnitude a first magnitude threshold of the vector quantity and matching with a positive sign or with a negative sign by said first component of the vector quantity measured along the first detection axis of the sensor.

More preferably, said predetermined wake conditions provide for:

exceeding in magnitude a first magnitude threshold of the vector quantity and matching with a positive sign or with a negative sign by said first component of the vector quantity measured along the first detection axis of the sensor; or exceeding in magnitude a second magnitude threshold of the vector quantity and matching with a positive sign or with a negative sign by said second component of the vector quantity measured along the second detection axis of the sensor.

In this way, the wake signal is sent every time at an orientation (detection axis) and at a sense (positive or negative sign), according to which the vector quantity is measured, which are different, and preferably configured so as to follow a movement, preferably a rotation, of the bicycle component when in use.

More preferably, said predetermined wake conditions also each comprise exceeding a time threshold of permanence of said first component of the vector quantity or, respectively, of said second component of the vector quantity, above the respective first and second magnitude threshold.

This allows to verify that the detected magnitude of the vector quantity is stably above-threshold, filtering the cases of false positives due to random or undesired oscillations of the magnitude of the vector quantity.

In other embodiments, said predetermined wake conditions provides for one of the following alternative conditions:

exceeding in magnitude a first magnitude threshold of the vector quantity and matching with a positive sign or with a negative sign by said first component of the vector quantity measured along the first detection axis of the sensor; or exceeding in magnitude a second magnitude threshold of the vector quantity and matching with a positive sign or with a negative sign by said second component of the vector quantity measured along the second detection axis of the sensor; or exceeding in magnitude a third magnitude threshold of the vector quantity and matching with a positive sign or with a negative sign by said third component of the vector quantity measured along the third detection axis of the sensor.

Preferably, in this case, said predetermined wake conditions each also comprise exceeding a time threshold of permanence of said first component of the vector quantity and, respectively, of said second and third component of the vector quantity, above the respective first, second and third magnitude threshold of the vector quantity.

More preferably, the sensor of the wake unit is an accelerometer.

In this case, said detected vector quantity is an acceleration.

When the sensor is an accelerometer, it is preferably selected from the group consisting of an accelerometer having piezoelectric effect, an accelerometer having piezoresistive effect, an accelerometer having capacitive effect, an accelerometer for measuring eddy currents.

Preferably, in this case, said predetermined wake conditions comprise exceeding in magnitude a first acceleration threshold and matching with a positive/negative sign by said first acceleration component measured along the first axis of the accelerometer.

More preferably, in this case, said predetermined wake conditions provide for:

exceeding in magnitude a first acceleration threshold and matching with a positive sign or with a negative sign by said first acceleration component measured along the first axis of the accelerometer; or exceeding in magnitude a second acceleration threshold and matching with a positive sign or with a negative sign by said second acceleration component measured along the second axis of the accelerometer.

In this way, the wake signal is sent every time at an orientation (axis of the accelerometer) and at a sense (positive or negative sign), along which the acceleration is measured, which are different, and preferably configured so as to follow the movement, preferably the rotation, that the bicycle component follows when in use.

For example, when the bicycle component is a crankarm, the magnitude, orientation and sense of the acceleration components measured along the detection axes of the accelerometer follow the rotation of the crankarm imparted by the cyclist during pedaling.

Preferably, the processor is configured to detect a rotary movement of the rotating bicycle component, more preferably based on an output signal of said sensor of the wake unit.

Preferably, the processor is configured to switch from the running mode to the standby mode when it does not detect any rotary movement of the rotating bicycle component for a time longer than a threshold value.

Preferably, the wake unit is completely supported by or in the bicycle component.

In other words, the wake unit does not comprise and does not require elements outside of the bicycle component for its operation.

Preferably, the electronic device comprises one or more electronic components selected from at least one stress/strain detector, a cadence detector, an analog-to-digital converter, a communication module, an external/internal temperature sensor, a volatile/non-volatile memory, which preferably contains the wake conditions, a battery power unit, a recharging connector, one or more internal connectors if the electronic device is made in many parts, one or more connectors towards the outside, a battery-charging and current and/or voltage limiting circuit, a protection circuit of the battery power unit (also indicated as ESD circuit), one or more light indicators, a control device of an electromechanical or electrohydraulic actuator of an element of the bicycle.

When the electronic device comprises a battery power unit, this preferably comprises one or more batteries that are replaceable, rechargeable on-board, or rechargeable in a detached condition from the electronic device.

When the electronic device comprises many electronic components, the processor is preferably configured so as to control the various electronic components such that the electronic device operates according to different operating states, like for example a full running state, also indicated as full wake state, a standby state, and possibly a temporary or partial running state (also called monitoring state).

For example, it is possible to provide that in the full wake state of the electronic device, all of the electronic components of which it consists are in a respective running mode; that in the standby state of the device, all of the electronic components are in standby mode and that in the partially running mode, some components, like for example the processor and the wake unit, are in operative or partially running mode, whereas others, currently not in use, are in standby mode.

Preferably, said electronic device implements or is part of a torque and/or power meter.

Alternatively or additionally, said electronic device implements or is part of a wireless communication system.

Alternatively or additionally, said electronic device implements or is part of an electromechanical or electrohydraulic actuator of an element of the bicycle.

In the case in which the electronic device implements or is part of a torque and/or power meter, preferably such a meter is of the symmetrical type, and comprises two subsystems made at each crankarm of the bicycle, one of said sub-systems including the aforementioned electronic device.

In alternative embodiments, the torque and/or power meter is of the asymmetric type.

In this case, the torque and/or power meter comprises a single system made at the crankarm on the transmission side of the bicycle or at the bottom bracket spindle of the crankset.

Preferably, when the sensor of the wake unit is an accelerometer, this also acts as cadence detector of the electronic device, in particular when the electronic device implements or is part of a torque and/or power meter.

Preferably, when the electronic device comprises a stress/strain detector, this comprises at least one strain gage and a relative reading unit.

The processor of the electronic device is in this case preferably configured to generate a torque signal based on the signal of said stress/strain detector and/or a power signal based on the signal of said stress/strain detector and the signal of said cadence detector.

Preferably, the processor is configured to turn on the stress/strain detector when the electronic device enters into full wake state and to turn off the stress/strain detector when the electronic device enters into the standby state (or partial running/monitoring state, where present).

Preferably, when the electronic device comprises the communication module, this preferably comprises a radio transceiver configured to communicate with an external component, in particular to communicate data such as the torque or power measured at the external component.

Preferably, in this case, the processor is configured to turn on the communication module when the electronic device enters into the full wake state and to turn off the communication module when the electronic device enters into the standby state (or partial running/monitoring state, where present).

Preferably, the method further comprises the step, executable by the wake unit of the electronic device, more in particular by the sensor thereof, or alternatively by a second sensor of the electronic device or located elsewhere on the bicycle, of detecting a rotary movement of the rotating bicycle component.

Preferably, the method also comprises the step, executable by the processor of the electronic device, of switching from the running mode to the standby mode at sleep conditions comprising at least one condition selected from the group consisting of: permanence for a time longer than a time threshold value of a predetermined position of the bicycle component with respect to a fixed reference element of the bicycle, of a predetermined inclination taken up by the bicycle and/or by the bicycle component with respect to a reference axis, of a predetermined load acting on the bicycle component, of a predetermined angular position of the rotating bicycle component or of the bicycle transmission component, taken up during a rotation movement about a rotation axis, and absence of rotary movement of the rotating bicycle component for a time longer than a time threshold value.

Preferably, the method further comprises the step, executable by the processor when in running mode, of processing crankarm rotation cadence data and/or pedaling torque data applied by the cyclist on the crankarm.

Preferably, the method further comprises the step, executable by the processor when in running mode, of generating a torque signal and/or a power signal.

Preferably, when the bicycle component is a crankarm, the pedaling torque data are obtained based on the force obtained from the output of a stress/strain detector and based on the length of the crankarm, which is known.

BRIEF DESCRIPTION OF THE DRAWINGS

Further features and advantages of the invention will become clearer from the description of preferred embodiments thereof, made with reference to the attached drawings, in which:

FIG. 1 illustrates a block diagram of an electronic device that can be associated with a bicycle component according to an embodiment of the invention;

FIG. 2 illustrates a block diagram of an electronic device that can be associated with a bicycle component according to a preferred embodiment of the invention;

FIG. 3 schematically illustrates a bicycle component according to a preferred embodiment of the invention;

FIG. 6 schematically illustrates the definition of wake conditions associated with a bicycle component according to an embodiment of the invention;

DETAILED DESCRIPTION OF THE PREFERRED EMBODIMENTS

Figure 4:
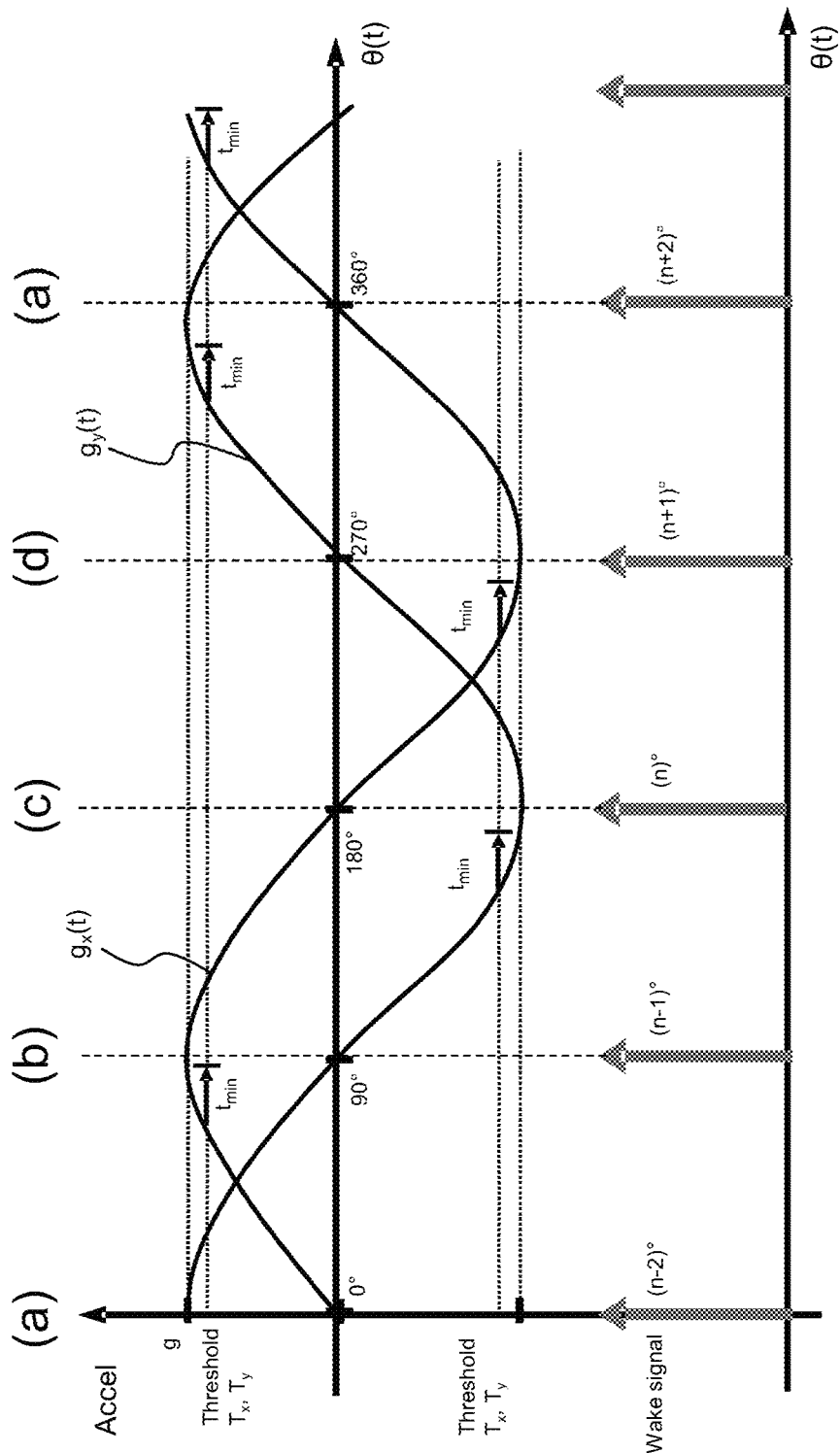
FIG. 4 illustrates a chart related to the trend over time of parameters that can be detected by a sensor of the electronic device of FIG. 2 associated with the bicycle component of FIG. 3.

FIG. 1 shows a block diagram related to an electronic device 10 configured to be associated with a bicycle component according to an embodiment of the invention. The electronic device 10 comprises a processor 12 and a wake unit 14 operatively connected to one another.

The processor 12 is suitably programmed to control one or more electronic components (not shown in FIG. 1), which can be part of the electronic device 10 itself or can belong to other electronic devices supported elsewhere on the same bicycle component or more in general on the bicycle.

The processor 12 and the wake unit 14, as well as the possible further electronic components of the electronic device 10, are powered by a suitable power source like for example a battery power unit (not shown), which can be integrated in the electronic device 10 itself or be located elsewhere on the bicycle.

For the purposes of saving energy, the processor 12 is configured to operate alternately according to a running mode and a standby mode, in which the energy consumption of the processor 12 is minimized.

The wake unit 14 comprises in particular a sensor 16 configured to detect one or more parameters associated with the bicycle component that supports the electronic device 10. The wake unit 14 is intended to wake the processor 12, taking it from the standby mode to the running mode, when the parameters detected by the sensor 16 satisfy predetermined wake conditions, defined and set as described in detail hereinafter with reference to the following figures. Similarly, the processor 12 is configured to enter into standby mode whenever certain sleep conditions occur, which can for example correspond to a certain value of the parameters detected by the sensor 16 of the wake unit 14 persisting for a certain time period.

The sensor 16 can for example be any one selected from the group consisting of an accelerometer, a magnetic field sensor, more preferably self-contained, an inclinometer, a gyroscope, a pressure sensor, a load cell.

In particular, the parameters detected by the sensor 16 of the wake unit 14 preferably comprise one or more components of a vector quantity, measured along one or more respective detection axes of the sensor According to the invention, the processor 12 is configured to update the wake conditions of the wake unit 14 after every waking, in particular shortly before entering into standby mode.

In some embodiments, the update of the wake conditions allows to minimize the chances of undesired waking of the processor 12 of the electronic device 10, achieving an advantageous energy saving.

Advantages that can be obtained in accordance with the invention are appreciable, for example, with reference to the preferred embodiment illustrated in FIGS. 2 and 3.

In this case, the bicycle component that supports the electronic device 100 is a bicycle transmission component as defined above, more in particular a crankarm, indicated with reference numeral 20 in FIG. 3.

The crankarm 20 shown is in particular a crankarm on the transmission side (in FIG. 3 it is indeed possible to see a chainring 22 of the front gearshift), but it could equally be a crankarm on the side opposite to the transmission side. The electronic device 100 is supported by the arm of the crankarm 20 and is preferably integrated thererewith.

As shown in the block diagram of FIG. 2, the electronic device 100 comprises the processor 12 and the wake unit 14, which in this case comprises an accelerometer 116 acting as a sensor. In this case, therefore, the vector quantity detected by the accelerometer 116 is an acceleration of the crankarm The actual acceleration to which a crankarm is subjected during the rotation thereof comprises in general the gravitational acceleration g, the centripetal acceleration and the tangential acceleration of the crankarm. Since, during the initial step of the pedaling motion or close to stopping, the terms of centripetal acceleration and tangential acceleration are of substantially negligible entity with respect to the gravitational acceleration g (specifically this takes place below a certain rotation speed), hereinafter, for approximation, it will be considered that only the latter acts on the crankarm. Therefore, only this last term of gravitational acceleration g is considered in the detections carried out by the accelerometer 116.

The accelerometer 116 is configured to detect the gravitational acceleration g to which the crankarm 20 is subjected in the rotation plane defined by the axes x and y, which correspond to the detection axes of the accelerometer 116.

The accelerometer 116 thus detects the two components $g_x$ and $g_y$ of the acceleration g, acting respectively along its perpendicular detection axes x and y. More in particular, the components $g_x$ and $g_y$ of the acceleration g are defined by a respective magnitude and a sign, positive or negative, that represents the sense thereof along the respective detection axis x or y.

As shown in FIG. 3, the axis x is defined oriented along an axial direction of the arm of the crankarm 20, whereas the axis y is oriented tangentially to the arm of the crankarm 20. The positive sense of the detection axis x of the accelerometer 116 is here fixed radially outwards, towards the pedal of the crankarm 20, whereas the positive sense of the axis y is fixed the same way as a rotation direction of the crankarm 20.

FIG. 4 is a chart that illustrates a qualitative trend of the components $g_x(t)$ and $g_y(t)$ of gravitational acceleration of the crankarm 20 detected by the accelerometer 116 as the rotation angle θ of the crankarm about its rotation axis (passing through the pin 24 of the crankarm) changes, an angle that in turn is correlated to time and is therefore indicated as θ(t).

The components $g_x(t)$ and $g_y(t)$ of the acceleration g, detected along the detection axes x and y of the accelerometer 116, have sinusoidal trends offset from one another by 90°. For example, as can be seen in FIG. 4, at the positive or negative peaks of the trend of the component $g_x(t)$, the component $g_y(t)$ is zero, and vice-versa.

Figure 5:
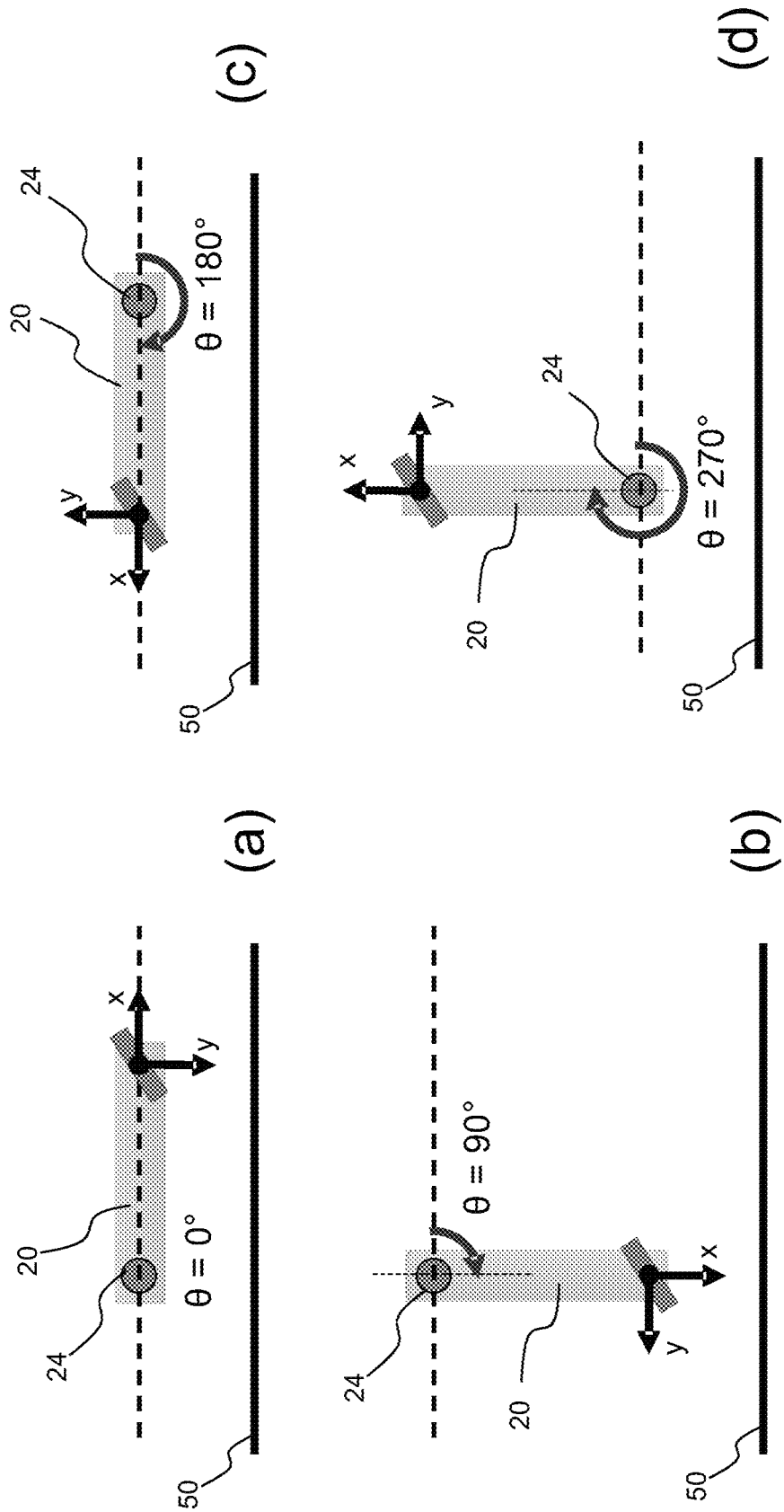
FIG. 5 schematically illustrates the bicycle component of FIG. 3 in different angular positions.

FIG. 5 schematically illustrates the crankarm 20 (for the sake of simplicity, the chainrings 22 have been omitted from the representation) in four angular positions with respect to the ground 50 on which the bicycle travels, angular positions taken up by the crankarm 20 in a sequence during a pedaling motion imparted by a cyclist.

Starting from the first angular position a), fixed by convention at 0° with respect to the ground 50, during the rotation thereof, which in FIG. 5 occurs in the clockwise direction, the crankarm 20 crosses in a sequence the further angular positions b) 90°, c) 180° and d) 270°. During the rotation of the crankarm 20, the detection axes x and y of the accelerometer that is fixed along the arm of the crankarm 20 consequently also rotate.

At the four angular positions a), b), c), and d), the component $g_x$ of the acceleration, detected by the accelerometer 116 along the axis x, takes up in a sequence magnitudes equal to 0, +g, 0 and −g, whereas the component $g_y$ detected at the axis y perpendicular to the axis x, takes on in a sequence magnitudes equal to +g, 0, −g and 0, as shown in FIG. 4.

The accelerometer 116 of the wake unit 14 is programmed to emit a wake signal, also indicated hereinafter as wake interrupt, intended for the processor 12, at any one of the positive or negative peaks of the component $g_x(t)$ and of the component $g_y(t)$ shown in FIG. 4. For example, the wake conditions can correspond to any one of the four angular positions a) 0°, b) 90°, c) 180° and d) 270° shown in FIG. 5.

For example, the predetermined wake conditions can be set so as to correspond in particular to the angular position of the crankarm 20 taken up in case c), to 180°. This means that, in order for the processor 116 to be woken up by the wake signal sent by the accelerometer 116 of the wake unit 14, the cyclist must make the crankarm carry out a rotation of 180° from the angular position at 0° (case a) with respect to the ground, crossing the angular position at 90° (case b) until the angular position at 180° is reached (case c). Only when this predetermined angular position is reached, the wake unit will emit the wake signal and the processor can enter the running mode.

As will become clearer from the description of FIG. 6 made hereinafter, the predetermined angular position is considered reached when the crankarm 20 enters into an angular delta or angle of tolerance about the specific angular position, to take into account a certain positional tolerance.

Similarly, in order to express this tolerance in terms of accelerations, the predetermined angular position is considered reached once a minimum acceleration threshold has been exceeded in magnitude by one of the two components $g_x$ and $g_y$ (basically, the non-zero one of the two) detected by the accelerometer, and by the matching with the respective positive or negative sign. In the specific case in which the predetermined angular position is at 180° (case c in FIG. 4), the wake conditions have occurred when the accelerometer 116 detects a component $g_y$ of negative sign that exceeds a minimum acceleration threshold in magnitude.

For example, the minimum acceleration thresholds Tx and Ty for each respective component $g_x$ and $g_y$ of the acceleration are defined in accordance with the following formulae (1) and (2) with reference to the trigonometric construction of FIG. 3:

$$Tx=|g*\sin(\theta)| \quad (1)$$

$$Ty=|g*\cos(\theta)| \quad (2)$$

Those skilled in the art will be capable of selecting each time the most suitable values of Tx and Ty based on the predetermined angular position defined by the angle θ and on the sampling frequency of the accelerometer.

For greater strength of the wake mechanism, the predetermined wake conditions preferably also include a minimum time $t_{min}$ of permanence of the acceleration component above the respective minimum acceleration threshold Tx or Ty. Basically, an acceleration value above threshold is taken in consideration by the accelerometer 116 for the generation of the interrupt only if this value is maintained for a time longer than the minimum time $t_{min}$. The provision of the minimum time $t_{min}$ acts as filter of possible random fluctuations and for brief periods of the acceleration values.

Advantageously, in accordance with the invention, the processor 12 is configured to update the predetermined wake conditions of the wake unit 14, specifically the predetermined angular position. The processor 12 carries out this operation each time, after the last wakeup and preferably just before entering into standby mode, so as to define a different updated angular position of the crankarm 20, starting from the predetermined angular position used at the last waking.

In accordance with the wake-wake updating mode described above, the updated angular position is in particular moved by 90° with respect to the predetermined angular position previously used. For example, in a practical case, if the last waking happened at the predetermined angular position of 0° (case a in FIG. 5), the subsequent wake signal of the processor will be generated by the accelerometer 116 at the angular position at 90° (case b in FIG. 5).

Alternatively, the system can be configured to implement the sleep-wake updating mode described above, in which case the updated angular position is moved by 90° with respect to the angular position taken up by the crankarm 20 upon the last entry of the processor 12 in standby phase. For example, if the sleeping of the processor 12 happened at the predetermined angular position of 0° (case a in FIG. 5), the subsequent wake signal of the processor will be generated by the accelerometer 116 at the angular position at 90° (case b in FIG. 5).

An example of definition of the updated angular position of the crankarm 20 in accordance with the sleep-wake mode is now described with reference to FIG. 6.

In the configuration shown, the processor (not visible here) of the electronic device 100 supported by the crankarm 20 is in standby mode since the crankarm 20 is in an angular position indicated in figure with REF not coinciding with the predetermined angular position P that corresponds to the wake conditions.

In particular, the predetermined angular position P shown here coincides with the position at 90° of case b) of FIG. 5. The angular position P is considered reached, and therefore the wake conditions to have occurred, when the crankarm 20 enters into the tolerance angle indicated in figure as $\theta_{wake}$ defined around the angular position P, and remains within such an angular delta for the minimum time $t_{min}$.

The ends E1 and E2 of the tolerance angle $\theta_{wake}$ are in particular identified by means of two angular deltas α and β from the reference position REF of the crankarm. The two angular deltas α and β are preferably bound by the following relationship:

$$\beta=n+\alpha \quad (3)$$

In this way, the tolerance angle $\theta_{wake}$ is centered around the predetermined angular position P.

In alternative embodiments, however, it is possible to provide angular deltas α and β totally independent from one another and also such as to obtain a tolerance angle $\theta_{wake}$ not centered around the predetermined angular position P.

The wake mechanism described above is very effective in minimizing the chances of undesired waking of the processor 12 of the electronic device 100.

The Applicant has indeed verified that, by each time updating (in other words modifying) the wake conditions for the emission of a subsequent wake signal, the chances that involuntary movements or vibrations of the bicycle component (in the example, the crankarm 20), not corresponding to rotations imparted by the cyclist through a pedaling movement, can satisfy such wake conditions and cause undesired waking of the processor 12 of the electronic device 100, are effectively minimized, thus advantageously preserving the charge of the battery power unit that powers the device 100 and its components.

In particular, since the update of the wake conditions involves modifying the angular position of the bicycle component at which the wake signal is emitted, the chances that the component randomly moves in the updated angular position, which is different each time from the previous one, are reduced substantially if not substantially canceled.

In other words, undesired and repeated vibrations or movements along a same axis and/or in a same sense (which, for example, could occur when the bicycle is transported on a vehicle and is subjected to vibrations) are prevented from causing the waking of the processor 12 in an undesired manner.

This is important because every wake involves a much greater consumption with respect to the standby state and therefore greater consumption of the battery power unit and shorter lifetime of the electronic device 100.

The wake mechanism described is, for example, particularly suitable for the application in a power meter on the crankarm 20 or other transmission component, since such type of power meter must necessarily pass through specific angular positions, in a specific order, bound by the fact that the cyclist must pedal to generate power.

Furthermore, the sleep-wake updating mode described above is particularly advantageous since it further decreases the chances of undesired waking of the processor 12. Indeed, the updated angular position is prevented from being by chance defined at the last angular sleep position of the processor 12.

Figure 7:
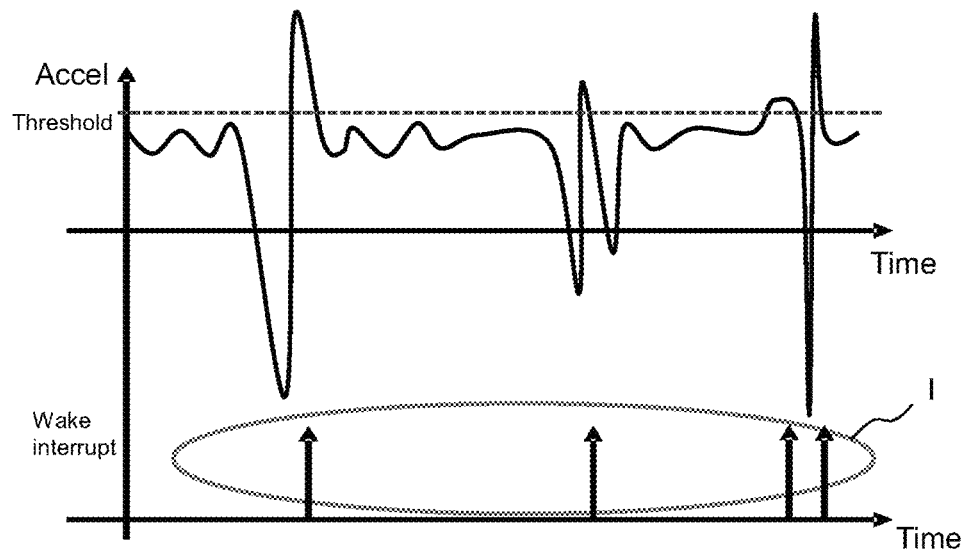
FIG. 7 illustrates a qualitative trend of parameters detected by a sensor with related wake signals according to the prior art.
Figure 8:
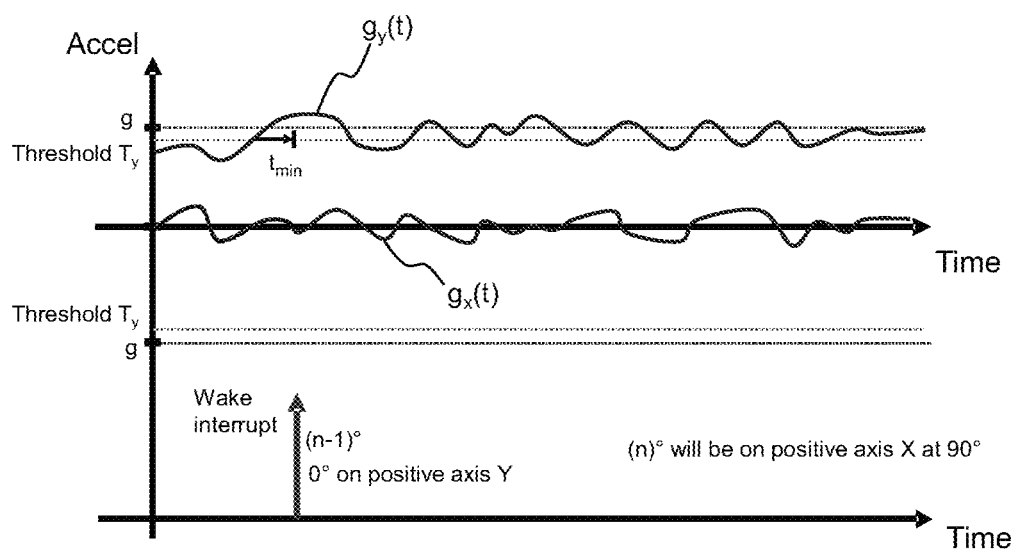
FIG. 8 illustrates qualitative trends of parameters detected by a sensor of an electronic device supported by a bicycle component with related wake signals according to an embodiment of the invention.

The aforementioned advantages can be better understood from the comparison between FIGS. 7 and 8.

FIG. 7 shows the trend of the acceleration detected by an accelerometer along a single detection axis in the presence of undesired vibrations and the generation of wake interrupt according to the prior art.

FIG. 8 illustrates the trend over time of the acceleration components $g_x$ and $g_y$ of the crankarm 20 in the presence of undesired vibrations and the generation of wake interrupt according to the invention.

The Applicant has observed that known wake systems (FIG. 7), wherein the generation of the wake interrupt by the accelerometer takes place each time after the detection of acceleration values above the threshold, but still detected along a same detection direction, easily give rise to undesired wake of the processor. Indeed, since the wake conditions always remain the same, if the undesired motion persists and generates accelerations above the threshold (for example during the transportation of the bicycle on the roof of a vehicle and in the presence of vertical bumps due to the passage on an uneven road), the processor will be woken up many times by the interrupts I erroneously emitted by the accelerometer, causing a useless consumption of the battery that powers the components.

As clear from FIG. 8, the wake mechanism according to the invention, on the other hand, since it provides for modifying the wake conditions at each start of sleeping of the processor 12, and in particular the definition of an updated angular position of the crankarm 20, more in particular moved by 90° with respect to the predetermined angular position used at the last wake, advantageously allows to avoid undesired waking.

In particular, if the crankarm is subject to repetitive random vibrations (for example during the transportation of the bicycle on a vehicle), even if a single first random wake takes place (for example at the predetermined angular position of 0°, case a in FIG. 5) and the minimum acceleration threshold $T_y$ for the acceleration component $g_y$ is exceeded, for a time longer than the minimum time $T_{min}$, the generation of further undesired wake interrupts by the accelerometer is prevented thanks to the update of the wake conditions (for example on an updated angular position of 90° (case b in FIG. 5)) operated by the processor 12 before entering into standby mode.

Figure 9:
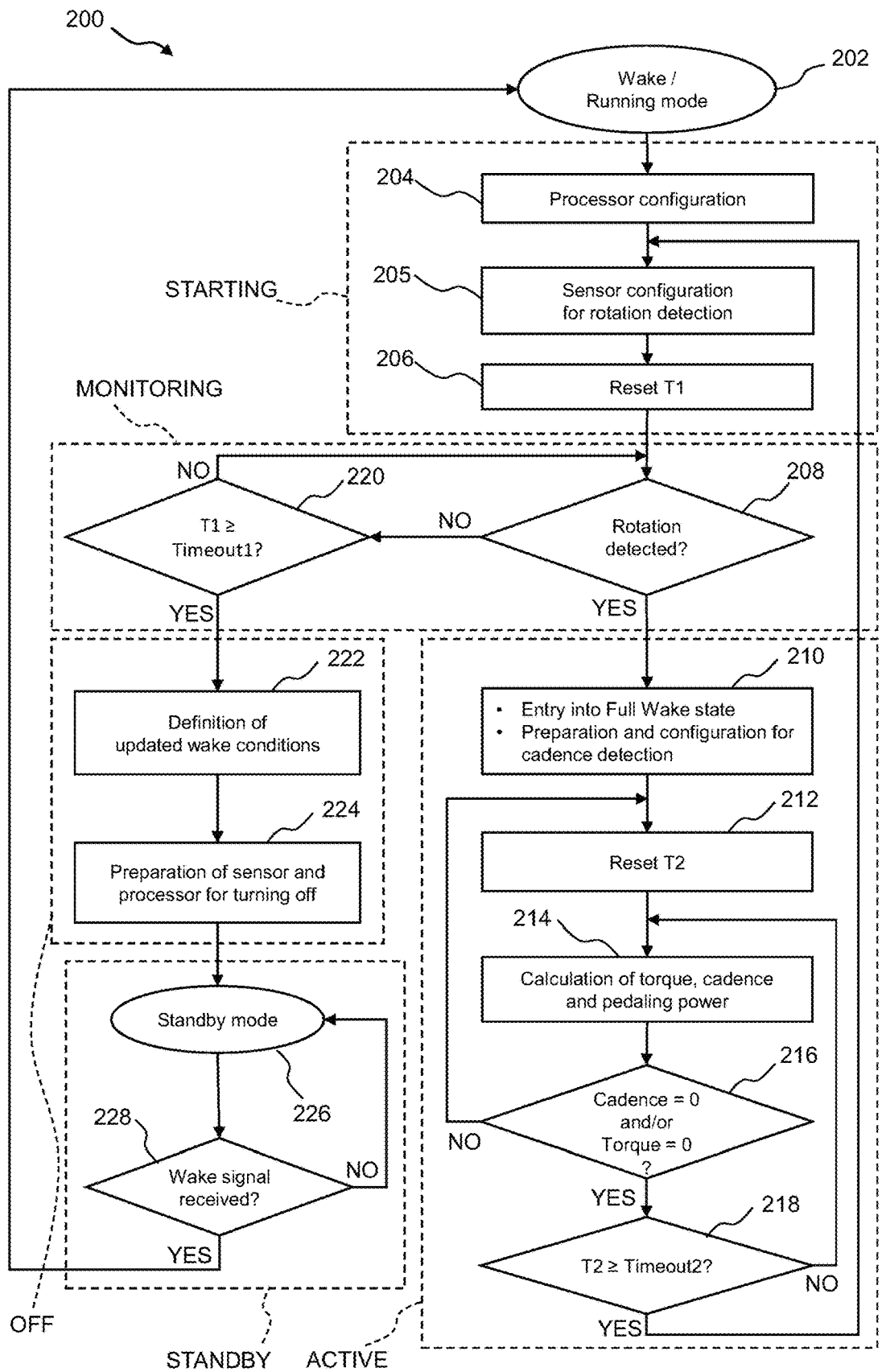
FIG. 9 illustrates a block diagram of a method of operating an electronic device associated with a bicycle component according to a preferred embodiment of the invention.

FIG. 9 shows a flowchart 200 related to a method of operating the electronic device 100 provided with the wake unit 14, according to a preferred embodiment of the invention. The flowchart represents in particular a program able to be executed by the processor 12 of the electronic device 100.

In this embodiment, the electronic device 100 implements a power meter and therefore also comprises one or more stress/strain detectors, in particular in the form of strain gages, an analog-to-digital converter, a communication module and a volatile/non-volatile memory, which stores the wake conditions.

In a block 202, the processor 12 wakes up and switches into a running mode.

The first execution of block 202 can take place for example after a wake signal received by the wake unit 14 (see block 228), or can be caused by switching on of an on-off switch that is not shown, or by the insertion in the electronic device 100 of a battery power unit not shown.

At block 202 the device 100 switches from a standby state (represented at blocks 226 and 228) to a STARTING and initial configuration state (blocks 204, 205 and 206).

In the standby state of the device 100, the accelerometer 116 is turned on in low consumption/wake mode (with reduced sampling for example at 8 bit, 10 Hz) adapted for ensuring the generation and transmission of the wake signal to the processor 12. Furthermore, in the standby state of the device 100, a small portion of the processor 12, called "sense unit", having very low consumption, for monitoring inputs, also preferably stays turned on so as to detect the wake signal coming from the accelerometer 116 when the wake conditions occur. Furthermore, other possible components of the electronic device 100 can be turned on like, for example, a protection circuit of the battery power unit (if present in the device 100).

Subsequently, in a block 204, the processor 12 starts an initial configuration procedure in which it self-configures and takes care of setting the auxiliary electronics.

In particular, at block 204 some portions of the processor 12 are preferably turned on, like for example the clock unit (RTC) and a data communication peripheral with the accelerometer 116 (for example of the SPI or I2C type), intended to monitor, at block 208, whether or not a rotation of the crankarm 20 has been detected.

In a subsequent block 205, the processor 12 configures the accelerometer 116 (or the wake unit 14 in general) so that it operates in a partial running/monitoring mode, adapted for the detection of the rotation of the crankarm 20. In particular, in this partial running/monitoring mode, the accelerometer 116 is adapted for sending an interrupt to the processor 12 at each change of quadrant of the crankarm 20, in other words each time that the crankarm 20 rotates a further 90°. This is obtained thanks to the fact that, in this mode, upon receiving each interrupt from the accelerometer 116, the processor 12 is adapted for modifying the configuration of the accelerometer 116 so that the next interrupt is sent from the accelerometer 116 to the processor 12 at an angle rotated by 90° with respect to the previous one.

The accelerometer 116, when it is in partial running/monitoring mode, has a precision and sampling frequency (for example 10 bit, 50 Hz) that are greater with respect to the aforementioned low consumption/wake mode, but lower with respect to the full wake mode where it reaches instead high precision and sampling frequency, for example 12 bit/400 Hz or more.

In a block 206, the processor 12 resets a first time counter T1.

In subsequent block 208, the processor 12 verifies whether the output of the accelerometer 116 of the wake unit 14 is indicative of a rotation of the crankarm 20.

Inside block 208, in order for a rotation by the processor 12 to be detected, it is necessary for a certain number of subsequent interrupts, for example after a passage of the crankarm 20 by 90° and then by 180°, to follow one another with a frequency that corresponds to a minimum rotation pedaling cadence. The time distance between two subsequent interrupts is for example 3 seconds, corresponding to a minimum rotation cadence of 20 rpm.

If the outcome at block 208 is negative, in other words if the processor 12 does not detect any rotation, the method moves to block 220 in which it is verified whether the time T1 is equal to or greater than a first timeout time Timeout1. For example, 10 s≤Timeout1≤30 s.

If the outcome at block 220 is negative, the method returns to the verification of block 208 (see above) and the processor 12 simply waits for a rotation event of the crankarm 20.

If the outcome at block 220 is positive, i.e. if the first timeout time Timeout1 has been exceeded, the method moves to block 222.

During the execution of blocks 208 and 220 of the method 200, the electronic device 100 is in a MONITORING state in which the accelerometer 116 is in a higher consumption state and works at a sampling frequency (for example 10 bit, 50 Hz), necessary to detect the rotation of the crankarm 20, which is greater with respect to the one in the standby state of the electronic device 100 (for example equal to 8 bit, 10 Hz) in which the accelerometer 116 operates in low consumption/wake mode and must only detect whether there has been a movement. Furthermore, the processor 12 is partially active.

If the outcome at block 208 is affirmative, in other words if the processor 12 detects a rotation of the crankarm 20, at block 210 the electronic device 100 enters into an ACTIVE or full wake state in which it remains during the entire execution of blocks 210-218 of the method 200. At block 210 the processor 12 configures the accelerometer 116 so that it sends the data necessary for the detection of the pedaling cadence to the processor 12 for the purposes of the subsequent calculation of the torque and/or power, increasing the precision and sampling frequency of the accelerometer by bringing them for example to 12 bit, 400 Hz. Furthermore, the processor 12 suspends the operation described above with reference to block 205 of modifying each time the angle of interrupt transmission by the accelerometer 116.

Furthermore, again at block 210, the processor 12 takes care of turning on all of the peripherals necessary for the operation of the device 100 (for example, communication module, analogue-digital converter, possible LEDs, reading unit of the stress/strain detector).

In the next block 212, a second time counter T2 is resetted.

Therefore, at block 214, the processor 12 carries out the calculation of the pedaling torque applied by the cyclist on the crankarm 20 based on the force obtained by the stress/strain detector, the calculation of the pedaling cadence based on the data obtained by the accelerometer 116 and the pedaling power based on the calculated torque and cadence.

In the next block 216, the processor 12 verifies whether at least one or both of the calculated cadence and torque are equal to zero.

In the negative case, the method returns to carrying out the block 212 of resetting the time counter T2 and the next block 214.

If, on the other hand, the verification of block 216 has a positive outcome, in other words if at least one of the cadence and the torque is zero, in a block 218 it is verified whether the second time counter T2 has exceeded a second timeout time Timeout2. For example, 10≤Timeout2≤30 s.

In the case of a positive outcome of the verification of block 218, i.e. if the second timeout time Timeout2 has been exceeded, the method returns to block 205, taking the accelerometer 116 back into partial running/monitoring mode, resetting the time counter T1 (block 206) and then returning to verifying, in block 208, whether the accelerometer has detected another rotation of the crankarm 20.

In the negative case of the verification of block 218, on the other hand, in other words if the time T2 has not exceeded the second timeout time Timeout2, the method moves once again to carrying out the calculation at block 214. In this way, the processor 12 takes into account the fact that also during the normal use of the bicycle, there are moments in which the crankarm is not set in rotation, but only temporarily: for example at the traffic lights, downhill, in the case of deceleration etc.

It should be observed that, in the case of a positive outcome of the verification of block 218, the method provides for moving from block 218 to block 205 (and not, for example, directly to block 222) and thus of switching from the full wake state to the monitoring state of the electronic device 100. This allows to avoid switching directly to the standby state of the electronic device 100 in situations in which the cyclist could start pedaling again after a short time from stopping and beyond the time defined by Timeout2, for example after having travelled a certain distance downhill without pedaling or a brief maintenance stop.

Indeed, if the time in which there is an absence of pedaling is relatively short, it is more advantageous in energetic terms to remain in the monitoring state instead of switching to the standby state, since a complete turning off with subsequent re-turning on involves an initial consumption peak. In any case, it is also possible to provide for moving directly from block 218 to block 222.

Going back to the verification of block 220, in the case of a positive outcome, the method 200 moves to the next block 222 in which the processor 12 defines updated wake conditions, represented in this case by an updated angular position. The update of the wake conditions is carried out by the processor 12 by updating the magnitude of the minimum acceleration thresholds $T_x$, $T_y$, the sense (positive or negative) of the acceleration components $g_x$ and $g_y$ along the two detection axes x and y, and possibly updating the minimum time threshold $t_{min}$ of staying above the acceleration threshold.

In the next block 224, the processor 12 prepares the device 100 for turning off by carrying out conventional shut-down procedures of the various electronic components so as to take itself and the device 100 into standby state.

During the execution of blocks 222-224 of the method 200, the electronic device 100 is in a start of TURNING OFF state that takes the processor 12 into standby mode (block 226) and the device 100 into the standby state (blocks 226 and 228).

Once it has entered into standby mode at block 226, the processor 12, and in particular its sense unit, stays active to ensure the monitoring of its inputs and in particular to verify (block 228) the reception of a possible wake signal by the accelerometer 116.

In the case of a negative outcome of the test, the processor 12 returns to block 226 and stays in standby state.

If, on the other hand, the verification of block 228 is positive and a wake signal is detected, the method starts again from block 202.

In order to further strengthen the wake mode of the processor 12, in alternative embodiments of the invention it is possible to suitably configure the processor 12 and/or the wake unit 14 so that the wake signal is sent to the processor 12 (block 228) only at "reiterated" wake conditions.

For example, in a first scenario, it is possible to configure the wake unit 14 so that it emits the wake signal direct to the processor 12 only after having counted a predetermined number N of passages (in other words rotations) of the crankarm 20 through the predetermined angular position previously defined (through a counter inside the wake device). In a similar way, it is possible to configure the wake unit 14 so that it emits the wake signal direct to the processor 12 only after having counted a predetermined number N of changes of quadrant of the crankarm, in other words N movements of 90° from the predetermined angular position established earlier. In order to detect these different passages, the accelerometer 116 can work at a slightly greater sampling frequency with respect to the general case described above, which results in a slightly greater energy consumption of the accelerometer 116 when the device 100 is in standby state. This scenario presumes taking some calculation functions inside the wake unit 14.

In a second scenario, it is possible to configure the processor 12 so that switching from the standby mode to the running mode of the processor 12 (switching from block 228 to block 202) takes place only after having received a plurality of reiterated wake signals by the wake unit 14 and in particular the accelerometer 116. This second scenario requires a pulse counter entering into the processor 12 also capable of operating with the processor partially turned off.

Although in the previous detailed description reference has mainly been made to a wake unit comprising an accelerometer acting as sensor, the invention also applies, mutatis mutandis, to wake units comprising a sensor of a different type like, for example, a magnetic field sensor, more preferably self-contained, an inclinometer, a gyroscope, a pressure sensor, or a load cell.

Furthermore, although reference has mainly been made to a crankarm, the invention is equally applicable to other components of the bicycle such as moving components, preferably rotating, of the bicycle, more preferably other components of the transmission of the bicycle like for example a pedal, a crankarm on the transmission side, a chainring, a bottom bracket spindle, a freewheel body of a cogset, or a sprocket.

Therefore, based on the type of bicycle component that supports the electronic device 10, 100 and the type of sensor 16 included in the wake unit 14, wake conditions can include, as well as a predetermined angular position of the component around its own rotation axis, further conditions like for example a predetermined position of the bicycle component with respect to a fixed reference element of the bicycle, a predetermined inclination taken up by the bicycle and/or by the bicycle component with respect to a reference axis, a predetermined load acting on the bicycle component, etc.

For example, in other embodiments, the bicycle electronic device 10, 100 can implement a wireless communication system, supported by a derailleur and/or by a relative control associated with it.

In this case, merely as an example it is possible to provide for a sensor of the wake unit intended to detect an inclination take up by the bicycle with respect to a reference axis or with respect to the magnetic/gravitational field of the earth. The wake conditions include, in this case, a respective predetermined inclination of the bicycle with respect to the aforementioned reference axis.

According to the invention, the processor is in this case preferably configured to update every time, before going back into standby mode, the subsequent wake conditions according to a sleep-wake updating mode, defining an updated inclination of the bicycle that is indicative of a use condition.

In a practical example, if the processor of the electronic device enters into standby mode when the bicycle remains "laying" on the ground for a certain time period, i.e. at a sleep condition corresponding to remaining, for a time longer than a time threshold value, with a substantially horizontal inclination of the bicycle, it is possible to provide for defining the next wake condition at an updated vertical inclination, so that the processor only wakes up when the bicycle is lifted from the ground by the user to be used.

Or, vice-versa, if the processor of the electronic device enters into standby mode when the bicycle remains positioned vertically for a certain time period, for example fixed onto a vehicle for the purposes of transportation, it is possible to differently provide for defining the next wake condition at an updated laterally inclined inclination, corresponding for example to the moment at which the user removes the bicycle from the vehicle and inclines it to get on it.

In yet alternative embodiments, the bicycle electronic device 10, 100 can be supported by a seat post or by a suspension of the bicycle.

In these cases, the sensor of the wake unit can be for example implemented by a load cell adapted for detecting a pressure/load acting on the saddle or respectively on the suspension. In the case of the suspension, it is possible to provide a sensor adapted for detecting the variations in length of the stems of the suspension like, for example, an optical sensor adapted for detecting notches on the stems.

The wake conditions can thus include, in this case, a predetermined load value acting on the seat post or on the suspension of the bicycle or, in the case of suspension, a predetermined length of the stems of the suspension, and the processor is consequently configured every time to define, according to a sleep-wake updating mode, updated wake conditions that are indicative of the use of the bicycle.

For example, if the processor of the electronic device enters into standby mode with an "unloaded" value (in other words minimum or zero load due to a user getting off the bicycle) remaining for a certain time period, it is possible to provide as updated wake condition an updated load value corresponding more or less to the minimum weight of a user acting on the saddle and/or on the suspensions so as to wake the processor when the user gets back onto the bicycle.

Or, vice-versa, if the processor of the electronic device enters into standby mode when the bicycle remains stationary with the user in the saddle for a certain time period, it is possible differently to provide as updated wake condition an "unloaded" value (in other words minimum or zero load), due to the user getting up to give a starting thrust after a temporary stop.

Also in these further cases, by changing the wake conditions it is possible to implement the wake mechanism according to an alternative, reliable and effective technique. Furthermore, it is possible to avoid undesired waking of the electronics of the device, due to vibrations or other conditions of the bicycle typically linked for example to transportation.

The above is a description of various embodiments of inventive aspects, and further changes can be brought without departing from the scope of the present invention. The shape and/or size and/or position and/or orientation of the various components and/or the sequence of various steps can be changed. The functions of an element or module can be carried out by two or more components or modules, and vice-versa. Components shown directly connected or in contact can have intermediate structures arranged between them. Steps shown directly following one another can have intermediate steps carried out between them. The details shown in a figure and/or described with reference to a figure or to an embodiment can apply in other figures or embodiments. Not all of the details shown in a figure or described in the same context must necessarily be present in a same embodiment. Features or aspects that are innovative with respect to the prior art, alone or in combination with other features, are deemed to be described per se, irrespective of what is explicitly described as innovative.

What is claimed is:

1. A method of operating an electronic device associated with a bicycle component and comprising a processor and a wake unit, the method comprising the following steps executable by the processor of the electronic device:
   operating alternatively in standby mode and in running mode,
   switching from standby mode to running mode upon receiving a wake signal from the wake unit at predetermined wake conditions, and
   before switching from the running mode to the standby mode, modifying the configuration of the wake unit by updating the predetermined wake conditions, such that the subsequent wake signal is sent to the processor at updated wake conditions.

2. The method according to claim 1, wherein the bicycle component is a moving component.

3. The method according to claim 2, wherein the predetermined wake conditions comprise at least one condition selected from the group consisting of a predetermined position of the bicycle component with respect to a fixed reference element of a bicycle, a predetermined inclination taken up by a bicycle and/or by the bicycle component with respect to a reference axis, a predetermined load acting on the bicycle component, a predetermined angular position of the rotating bicycle component, taken up during a rotation movement about a rotation axis.

4. The method according to claim 2, wherein the bicycle moving component is a bicycle transmission component.

5. The method according to claim 1, wherein the wake unit comprises a sensor, and the method further comprises the following steps, executable by the wake unit of the electronic device:
   detecting parameters associated with the bicycle component by means of said sensor; and
   sending the wake signal to the processor when the parameters detected by the sensor satisfy the predetermined wake conditions.

6. The method according to claim 5, wherein, in the step of modifying the configuration of the wake unit, the updated wake conditions are defined starting from the predetermined wake conditions or starting from a value taken up by the parameters detected by the wake unit upon switching from the running mode to the standby mode of the processor.

7. The method according to claim 5, wherein, when the predetermined wake conditions comprise a predetermined angular position of the rotating bicycle component, in the step of modifying the configuration of the wake unit the predetermined wake conditions are updated to an updated angular position that is moved:
   by a predetermined updating angle with respect to said predetermined angular position, or
   by a predetermined updating angle with respect to the angular position taken up by the bicycle component upon switching from the running mode to the standby mode of the processor.

8. The method according to claim 5, wherein the parameters detected by the sensor of the wake unit comprise a first component of a vector quantity, measured along a first detection axis of the sensor, said first component of said vector quantity, being defined by a respective magnitude and a positive or negative sign that represents the sense thereof along the respective detection axis.

9. The method according to claim 8, wherein said predetermined wake conditions provide for exceeding in magnitude a first magnitude threshold of the vector quantity and matching with a positive sign or with a negative sign by said first component of the vector quantity measured along the first detection axis of the sensor; or, where a second component of said vector quantity is also present, said predetermined wake conditions provide for:
   exceeding in magnitude a first magnitude threshold of the vector quantity and matching with a positive sign or with a negative sign by said first component of the vector quantity measured along the first detection axis of the sensor; or
   exceeding in magnitude a second magnitude threshold of the vector quantity and matching with a positive sign or with a negative sign by said second component of the vector quantity measured along a second detection axis of the sensor.

10. The method according to claim 8, wherein the sensor of the wake unit is an accelerometer, and said detected vector quantity is an acceleration.

11. The method according to claim 8, wherein the parameters detected by the sensor of the wake unit further comprise a second component of a vector quantity, measured along a second detection axis of the sensor, said second component of said vector quantity being defined by a respective magnitude and a positive or negative sign that represents the sense thereof along the second detection axis.

12. The method according to claim 1, further comprising the step, executable by the processor of the electronic device, of switching from the running mode to the standby mode at sleep conditions comprising at least one sleep condition selected from the group consisting of: permanence for a time longer than a time threshold value of a predetermined position of the bicycle component with respect to a fixed reference element of a bicycle, of a predetermined inclination taken up by a bicycle and/or by the bicycle component with respect to a reference axis, of a predetermined load acting on the bicycle component, of a predetermined angular position of the rotating bicycle component, taken up during a rotation movement about a rotation axis, and absence of rotary movement of the rotating bicycle component for a time longer than a time threshold value.

13. A bicycle component comprising an electronic device including:
   a processor suitable for operating alternately in standby mode and in running mode, and
   a wake unit operatively connected to the processor and configured so as to send a wake signal to the processor to switch from the standby mode to the running mode at predetermined wake conditions,
wherein, before switching from the running mode to the standby mode, the processor is every time configured for modifying the configuration of the wake unit by updating the predetermined wake conditions, such that the subsequent wake signal is sent to the processor at updated wake conditions.

14. The bicycle component according to claim 13, wherein said bicycle component is a moving component.

15. The bicycle component according to claim 13, wherein the wake unit comprises a sensor configured to detect parameters associated with the bicycle component, and wherein the wake unit is configured to send said wake signal to the processor when the parameters detected by the sensor satisfy the predetermined wake conditions.

16. The component according to claim 13, wherein said electronic device comprises one or more electronic components selected from the group consisting of at least one stress/strain detector, a cadence detector, an analog-to-digital converter, a communication module, an external/internal temperature sensor, a volatile/non-volatile memory, a battery power unit, a connector, a battery-charging and current and/or voltage limiting circuit, a protection circuit of the battery power unit, one or more light indicators, a control device of an electromechanical or electrohydraulic actuator.

17. The component according to claim 13, wherein said electronic device implements or is part of a torque meter and/or of a power meter and/or of a wireless communication system and/or of an electromechanical or electrohydraulic actuator.

18. The bicycle component according to claim 13, wherein said wake unit comprises a sensor selected from the group consisting of an accelerometer, a magnetic field sensor, an inclinometer, a gyroscope, a pressure sensor, and a load cell.

19. The bicycle component according to claim 13 wherein said bicycle component is a rotating component.

20. The bicycle component according to claim 13 wherein said bicycle component is selected from the group consisting of a crankarm, a pedal, a spider leg of a crankarm on a transmission side, a chainring, a bottom bracket spindle, a freewheel body of a cogset, and a sprocket.

\* \* \* \* \*